US008433612B1

(12) United States Patent
Sharma et al.

(10) Patent No.: US 8,433,612 B1
(45) Date of Patent: Apr. 30, 2013

(54) METHOD AND SYSTEM FOR MEASURING PACKAGING EFFECTIVENESS USING VIDEO-BASED ANALYSIS OF IN-STORE SHOPPER RESPONSE

(75) Inventors: Rajeev Sharma, State College, PA (US); Priya Baboo, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 948 days.

(21) Appl. No.: 12/079,624

(22) Filed: Mar. 27, 2008

(51) Int. Cl.
*G06Q 30/00* (2006.01)
(52) U.S. Cl.
USPC .................. 705/14.41; 705/7.29; 705/7.15
(58) Field of Classification Search .................. None
See application file for complete search history.

(56) References Cited

U.S. PATENT DOCUMENTS

| | | | |
|---|---|---|---|
| 5,204,703 A | 4/1993 | Hutchinson et al. | |
| 7,567,917 B2 * | 7/2009 | Miller et al. | 705/7.29 |
| 7,606,728 B2 * | 10/2009 | Sorensen | 705/7.29 |
| 2005/0189415 A1 * | 9/2005 | Fano et al. | 235/383 |
| 2007/0260521 A1 * | 11/2007 | Van Der Riet | 705/14 |
| 2007/0282665 A1 * | 12/2007 | Buehler et al. | 705/10 |
| 2008/0065468 A1 * | 3/2008 | Berg et al. | 705/10 |
| 2008/0243614 A1 * | 10/2008 | Tu et al. | 705/14 |
| 2009/0222305 A1 * | 9/2009 | Berg, Jr. | 705/7 |

OTHER PUBLICATIONS

U.S. Appl. No. 11/805,321, Sharma, et al.
U.S. Appl. No. 11/818,554, Sharma, et al.
U.S. Appl. No. 11/901,691, Sharma, et al.
U.S. Appl. No. 12/011,385, Sharma, et al.
J. Cohn, et al, "Automated face analysis by feature point tracking has high concurrent validity with manual FACS coding," Psychophysiology 36, pp. 35-43, Cambridge University Press, 1999.
I. Essa, et al., "Facial expression recognition using a dynamic model and motion energy," presented at International Conference on Computer Vision, Jun. 1995.
Y. Yacoob, et al.; "Recognizing human facial expression," University of Maryland, Technical Report CS-TR-3265, May 1994.

* cited by examiner

*Primary Examiner* — Luna Champagne (57) ABSTRACT

The present invention is a method and system for measuring packaging effectiveness based on video-based analysis of people in the vicinity of a plurality of package concepts. The present invention measures the response of people to the different packaging concepts, wherein the quantified response measurement shows the ability of the packaging concepts to attract, engage, and motivate people to purchase. The video-based analysis comprises behavior analysis, demographic analysis, and emotion change detection in response to the package effectiveness. The present invention captures a plurality of input images of the people in the vicinity of a plurality of package concepts by a plurality of means for capturing images. The plurality of input images is processed in order to understand the effectiveness of packaging design and changes. The processes are based on a novel usage of a plurality of computer vision technologies to analyze the visual characterization of the people from the plurality of input images in relation to the packaging design and changes.

10 Claims, 10 Drawing Sheets

PACKAGE 1 — 618

|        | IDX. 1 | IDX. 2 | IDX. 3 | IDX. 4 | IDX. 5 |
|--------|--------|--------|--------|--------|--------|
| SEG. 1 | .75    | .38    | .51    | .38    | .38    |
| SEG. 2 | .12    | .83    | .38    | .38    | .87    |
| SEG. 3 | .64    | .72    | .64    | .72    | .72    |
| SEG. 4 | .38    | .38    | .38    | .38    | .38    |

PACKAGE 2 — 619

|        | IDX. 1 | IDX. 2 | IDX. 3 | IDX. 4 | IDX. 5 |
|--------|--------|--------|--------|--------|--------|
| SEG. 1 | .75    | .38    | .51    | .38    | .38    |
| SEG. 2 | .12    | .83    | .38    | .38    | .87    |
| SEG. 3 | .64    | .72    | .64    | .72    | .72    |
| SEG. 4 | .38    | .38    | .38    | .38    | .38    |

METHOD AND SYSTEM FOR MEASURING PACKAGING EFFECTIVENESS USING VIDEO-BASED ANALYSIS OF IN-STORE SHOPPER RESPONSE

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of the Invention

The present invention is a method and system for measuring packaging effectiveness based on video-based analysis of people in the vicinity of a plurality of package concepts, by measuring the response of people to the different packaging concepts, wherein the quantified response measurement shows the ability of the packaging concepts to attract, engage and motivate people to purchase, and whereby the video-based analysis comprises behavior analysis, demographic analysis, and emotion change detection in response to the package effectiveness.

2. Background of the Invention

There have been prior attempts for evaluating the effectiveness of packaging. U.S. Pat. No. 5,204,703 of Hutchinson et al. (hereinafter Hutchinson) disclosed a method for measuring a subject's eye movement and pupil diameter when exposed to visual stimuli for identifying which packaging arouses people's interest. This method includes a presentation device that stimulates the subject with various pictures, an eye-looking detector to identify where the subject looks, and a computer and storage device to correlate and record the lookpoints on the image and construct a graph of the lookpoints and the measured pupil diameters. Hutchinson's method of showing a picture to identify the impact of packaging on people is very rudimentary, and cannot accurately pinpoint the most effective packaging concept because the evaluation is done in isolation, in a lab setting. The effectiveness of packaging should be measured in a retail setting to identify the relative effectiveness of a package among various competitive packages. Moreover, this method cannot involve large sample sizes due to the evaluation being conducted in a lab setting, making the approach inadequate for accurately assessing the impact of a package.

Several companies like Decision Analyst Inc., employ Internet-based screening studies for identifying the effectiveness of packaging. This method involves recruiting qualified respondents from the Internet panels to evaluate package design. Respondents view one package at a time beginning with a package's front panel and later viewing the other panels. A series of questions are fielded to the respondent after viewing the package, and the answers are coded for analysis and interpretation. There are some concerns about using this technique to gain insight on packaging: (i) the size and ability of a computer monitor can alter the size, color and clarity of images on the package, making it difficult, if not impossible, to accurately assess the impact; (ii) evaluating a package in isolation without considering the way packages are laid out in a retail setting could distort the effectiveness measure of a package, thus making the approach non-realistic; (iii) as the respondents are part of a recruited panel, the evaluation can be biased leading to faulty conclusions about the effectiveness of a package; and (iv) the sample size is limited because of the cost involved in acquiring information. However, the present invention evaluates the package in a retail setting, thus providing an accurate assessment of the package with regard to its competitors. In addition, the behavior of all shoppers in front of the package is automatically tracked and analyzed resulting in a more systematic evaluation. Identifying the behavior of all the shoppers that view the package provides insights from the entire population instead of a sample, making the evaluation more accurate.

Companies like Perception Research Services, Inc., employ mobile eye-tracking units to determine the effectiveness of packaging. This method requires a shopper to wear a head-mounted eye-tracking unit that records each person's focal points as he or she shops. The videotapes are manually analyzed to understand each shopper's involvement with specific packages. This method of evaluation is cumbersome since it requires the shopper to wear an apparatus on his or her head. Not many shoppers would opt to wear the apparatus, resulting in a very small sample size. In addition, the cost associated with such an exercise will result in a limited sample. The technique is not very scalable as it requires a manual observer to view the video tapes for analyzing and interpreting the data. Since the shopper sample is part of a recruited panel, the information obtained about the effectiveness of a package can be biased. On the contrary, the present invention employs automated technologies for analyzing the behavior of shoppers in front of the package, resulting in an unbiased analysis. The automation also aids in understanding the effectiveness of a package from a large sample size, making the evaluation more systematic and accurate.

SUMMARY

The present invention is a method and system for measuring packaging effectiveness based on video-based analysis of people in the vicinity of multiple package concepts, whereby video-based analysis comprises behavior analysis, demographic analysis, and emotion change detection.

The present invention captures multiple input images of the people by at least a means for capturing images in the vicinity of multiple package concepts and processes the multiple input images in order to perform the video-based analysis of each person in the people for the multiple package concepts. Then, the present invention measures the effectiveness of a package through video-based analysis of shopper responses to different packaging concepts. The video-based analysis comprises behavior analysis, demographic analysis, and emotion change detection.

Further, the package is evaluated in the retail context—identifying the relative effectiveness of a package to attract, engage and motivate shoppers to make a purchase, ahead of its competitors. The retail context comprises information from measuring several packaging concepts in a physical location along with the competitors while taking into consideration temporal information such as time of year, and other in-store factors, like promotion of a product. The retail context also comprises the physical location information of the package concepts, the local influence of the store, trends, temporal information such as time of year, and the prior knowledge about the package concepts.

In an exemplary embodiment, the present invention can identify an absolute number of shoppers along various interaction stages, while categorizing the shoppers into different demographic segments—based on gender, age-range and ethnicity—at each stage. Further, the conversion indices between the interaction stages will be identified for each demographic shopper segment, including reach to attract index, attract to engage index and engage to motivate index. For each package, a metrics with the indices will be identified and compared with that of the other concepts, thus providing a tool for evaluating the effectiveness of various packaging concepts.

In an exemplary embodiment, the present invention can compare the measurements among multiple package concepts synchronously in multiple locations. The present invention can also compare the measurements among the multiple package concepts asynchronously in the same locations.

The present invention changes a feature in the package concepts, and it measures the effectiveness of the newly changed packaging. The approach can be applied to a feature in multiple package concepts for a new product, and the effectiveness of the newly changed package concepts can be measured.

In a preferred embodiment, the present invention processes the video-based analysis automatically. However, in another exemplary embodiment, the present invention processes the video-based analysis semi-automatically, where a manual annotation tool is used in combination with automatic behavior analysis, demographic analysis, and emotion change detection.

It is a further objective of the present invention to organize the measurement of the packaging effectiveness based on the segmentation and trip of the multiple persons. The segmentation comprises demographic segments including age-range, gender and ethnicity. The trip comprises the shopping pattern of the multiple persons including quick, special occasion, fill-in and stock-up trips.

Further, the present invention can evaluate the engagement process of the person with each packaging concept in granular detail in an exemplary embodiment. The granular detail comprises the behavior of reading labels, comparing products, comparing package sizes, sniffing products, and other physical interactions with the product.

DRAWINGS

Figures

DETAILED DESCRIPTION OF THE INVENTION

Figure 1:
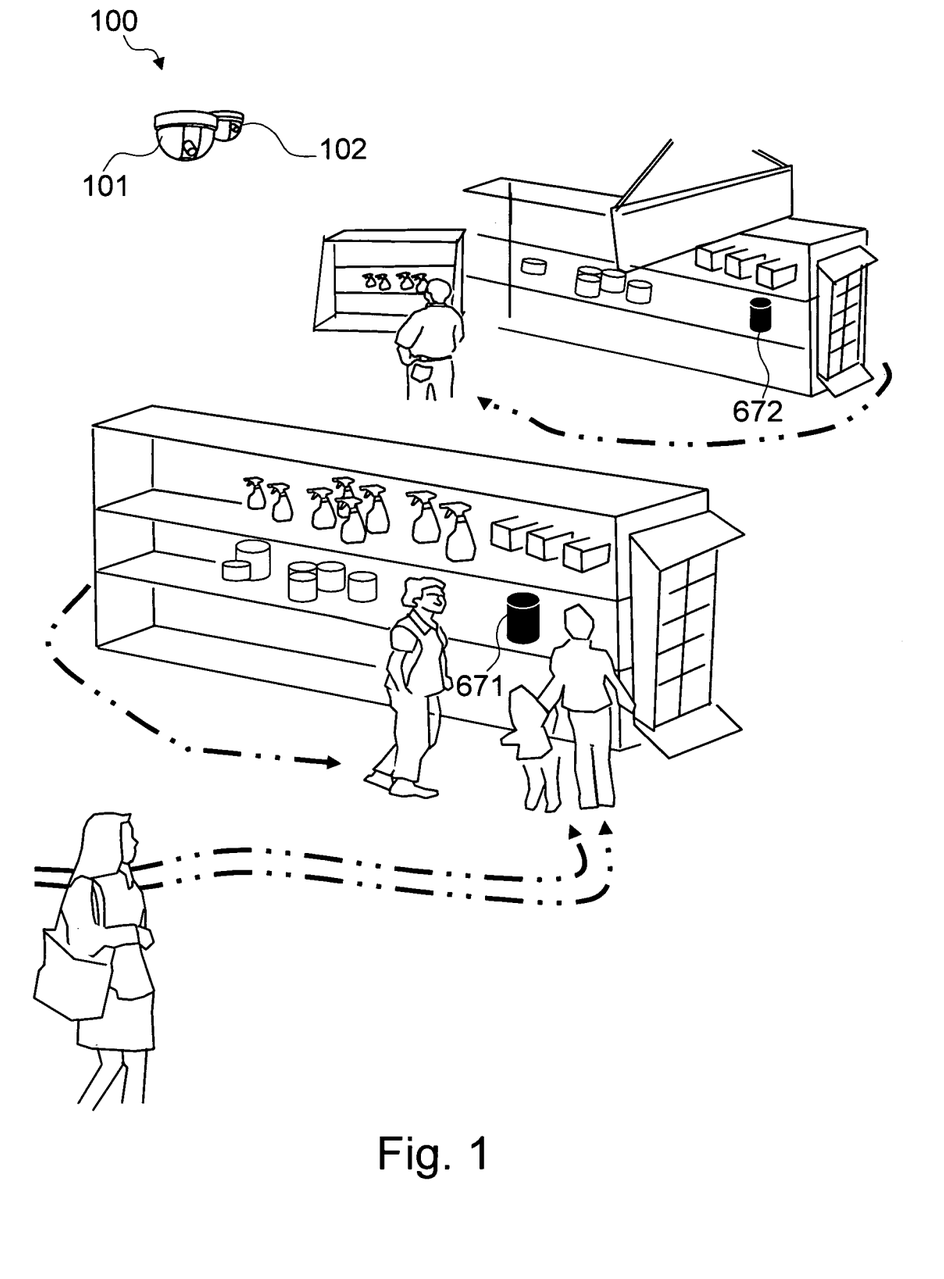
FIG. 1 shows how an exemplary embodiment of the invention is applied to the packaging effectiveness measurement in a physical space.

FIG. 1 shows how an exemplary embodiment of the invention is applied to the packaging effectiveness measurement in a physical space.

The present invention is a method and system for measuring packaging effectiveness using video-based analysis of people in the vicinity of multiple package concepts, whereby video-based analysis comprises behavior analysis, demographic analysis, and emotion change detection.

The present invention captures multiple input images of the people by at least a means for capturing images 100, i.e. the first means for capturing images 101 and the second means for capturing images 102, in the vicinity of multiple package concepts, such as package 1 671 and package 2 672, and processes the multiple input images in order to perform the video-based analysis of each person in the people for the multiple package concepts. Then, the present invention measures packaging effectiveness based on the video-based analysis for the people. The video-based analysis comprises behavior analysis, demographic analysis, and emotion change detection.

The present invention provides an opportunity for manufacturers to evaluate the retail shelf impact of various packaging concepts among targeted consumer segments. The evaluation is conducted by employing its breakthrough measurement technologies for automated in-store analysis of shopper behavior and demographics. This provides a systematic evaluation of the packaging concepts in a real-world setting that incorporates the shopping environment, the target audience and their shopping trip missions.

The definition of package in the invention comprises a method to communicate with shoppers about the product. The definition of the packaging effectiveness in the present invention is the ability to
    attract attention,
    influence engagement,
    convey a message, and
    influence purchase in the end, for metrics.

Exemplary methods in the conventional packaging effectiveness application in the prior art include survey and lab test. One of the problems in the conventional methods is that they cannot measure the true packaging effectiveness in a real retail environment. Survey is usually performed after a shopping interaction, and the lab test does not reflect the real-time situation of the shopping interaction. Both methods are also influenced by the shoppers' consciousness, which does not truly reflect the actual packaging performance.

Therefore, one of the goals of the measurement in the present invention is to have an objective and quantifiable measurement of the effectiveness in attracting, engaging, and motivating shoppers to make a purchase. The output of the present invention can influence packaging and package design, such as a cereal box design.

The systematic evaluation provides a clear understanding of the effectiveness of each packaging concept in converting shoppers along the various stages of the shopper interaction funnel. Each of the packaging concepts is evaluated for its ability to:
  stand out from the other products and attract shoppers,
  engage with shoppers, and
  motivate shoppers to make a purchase.

Further, the engagement process of shoppers with each packaging concept can be evaluated in granular detail to understand the various types of emotional response and interaction with packages including:
  reading labels,
  comparing products,
  comparing package sizes, and
  other intriguing behaviors, like sniffing products.

Such comprehensive evaluation will determine the strengths and weaknesses of each packaging concept in influencing shoppers to make a purchase.

This systematic evaluation can also be conducted to identify a package's influence on different demographic shopper segments (based on age-range, gender and ethnicity) with varied trip missions (quick, special occasion, fill-in, and stock-up). The in-depth evaluation will deliver a clear understanding of the relative effectiveness of each packaging concept in driving desired behavior from each of the shopper segments.

The present invention systematically evaluates the packaging concepts in retail store(s), either sequentially or in parallel through a monadic research design.
  A sequential monadic research evaluation involves testing all packaging concepts in the same retail store(s) and in the same product location during different time periods. After evaluating one concept for a particular time period, for example one week, the next concept is tested. Appropriate care is taken to ensure that the time period does not have any other variation, like changes in the promotional activity of the product or any other change in the in-store environment.
  A parallel monadic research evaluation involves testing all packaging concepts during the same time period in multiple stores with similar demographic and psychographic profiles of shoppers. In all the stores under study, care is taken to ensure that the product is merchandised in a similar location and all other in-store environmental factors are similar.

Overall, the packaging concepts are compared with each other along several measures—absolute number of shoppers along each stage of the shopper interaction funnel, conversion indices along each stage of the funnel, and the overall ratio of buyers. The comparison along multiple measures provides a performance score card for each concept, clearly indicating its ability to drive desired shopper behavior.

The systematic evaluation in the present invention helps manufacturers to identify the best packaging concept that will win at retail—one that cuts through retail clutter, connects with the consumer, becomes part of the active consideration set, and ultimately results in a purchase.

Figure 2:
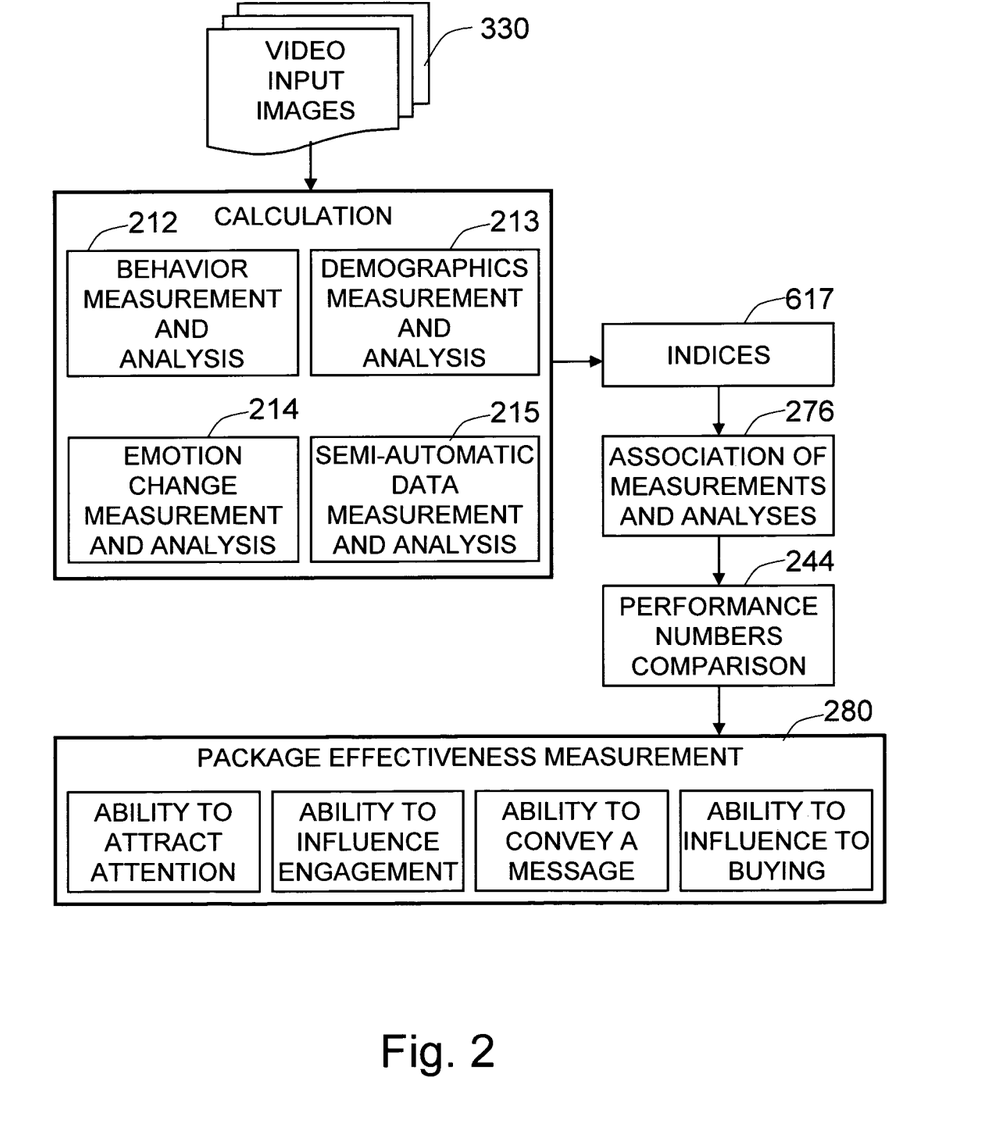
FIG. 2 shows exemplary key components of the present invention.

FIG. 2 shows exemplary key components of the present invention.

The present invention comprises modules of:
  automatic behavior measurement and analysis 212,
  automatic demographics measurement and analysis 213,
  automatic emotion change measurement and analysis 214,
  semi-automatic other data measurement and analysis for interaction 215, and
  a module for associating 276 the measurements and analyses that processes a performance numbers comparison 244.

The present invention identifies high-level numbers along various interaction stages of the person for each package. The variables can include behavioral measurement and segment information, such as demographics.

In an exemplary embodiment, the emotion change detection can measure positive or negative reaction or emotional expression to the packing change.

Based on the variables, the present invention measures indices 617 for each package as performance numbers. The indices 617 comprise a reach to attract index, attract to engage index, and engage to motivate index. Then, the present invention compares the measurements among the multiple packages that are evaluated. For example, the present invention can compare packages' conversion ratios. More people read certain packages for a longer time in a predefined window of time. In an exemplary embodiment, the present invention produces at least a metrics for the indices.

Furthermore, the present invention measures the effectiveness for each demographic segment. Demographic segmentation can be used to identify the impact of packaging on specific shopper segments. In an exemplary embodiment, the present invention produces comparison results of the index metrics in relation to demographic segmentation.

Figure 3:
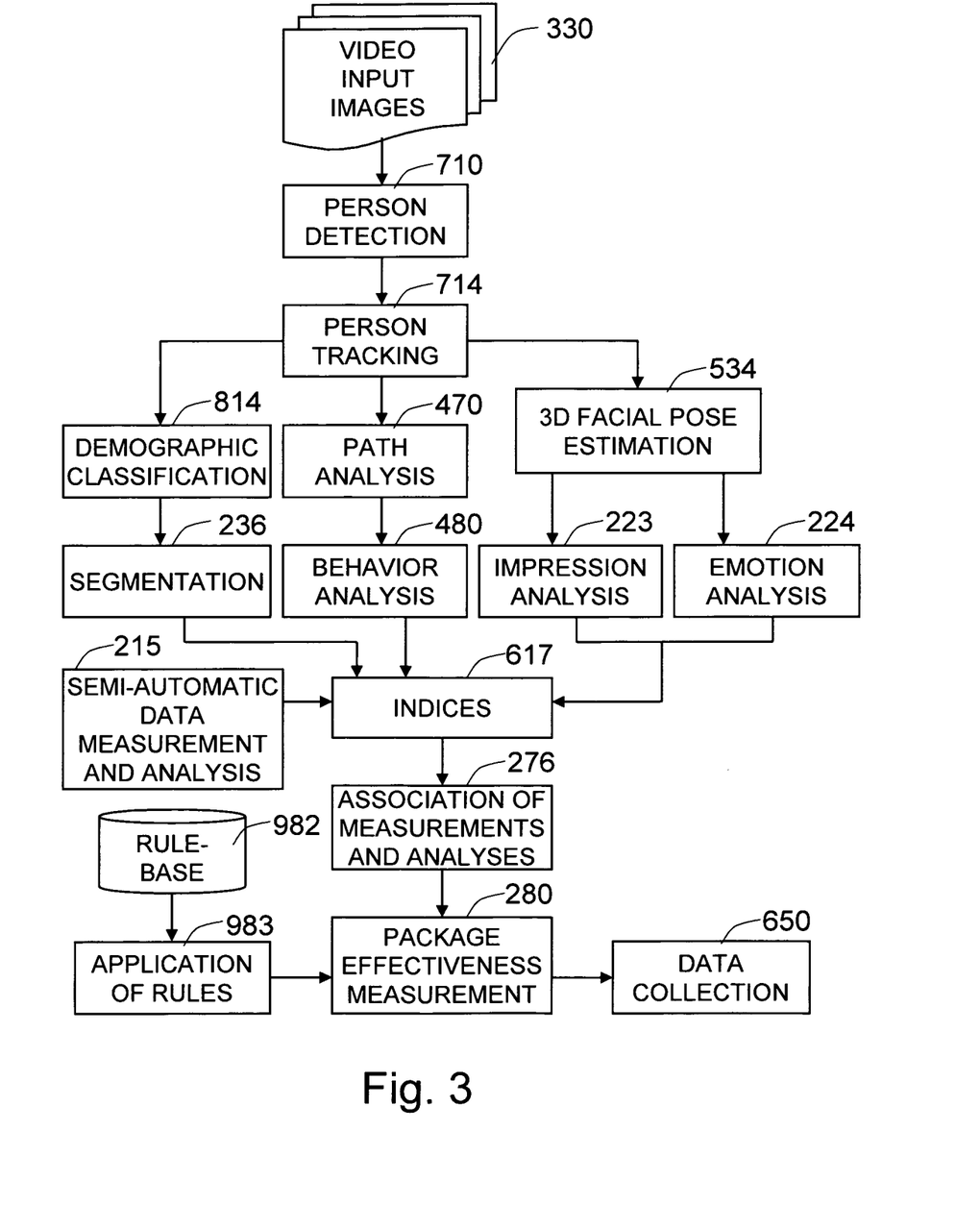
FIG. 3 shows exemplary processes for the measurement, in which computer vision based behavior analysis and segmentation measurement, i.e., demographics measurement, impression analysis, and emotion analysis are associated in an exemplary embodiment of the invention.

FIG. 3 shows exemplary processes for the measurement, in which computer vision-based behavior analysis 480 and segmentation 236 measurement, i.e., demographics measurement 814, impression analysis 223, and emotion analysis 224 are associated in an exemplary embodiment of the invention.

In a preferred embodiment, the present invention processes the video-based analysis automatically. However, in another exemplary embodiment, the present invention can process the video-based analysis semi-automatically 215, where a manual annotation tool is used in combination with automatic behavior analysis, demographic analysis, and emotion change detection. The present invention can utilize an efficient video annotation tool, such as U.S. patent application Ser. No. 12/011,385 of Sharma, et al. (hereinafter Sharma Ser. No. 12/011,385).

The present invention can organize the measurement of the package effectiveness 280 based on the segmentation and trip of the people. The segmentation comprises demographic segments, including age-range, gender, and ethnicity. The trip comprises the shopping pattern of the people.

Further, the present invention can evaluate the engagement process of the person with each packaging concept in granular detail in an exemplary embodiment. The granular detail comprises the behavior of reading labels, comparing products, comparing package sizes, sniffing products, and other physical interactions with the product.

In the exemplary embodiment, shown in FIG. 3, the present invention detects 710 and tracks 714 a person, such as a customer, in the video input images 330, from a plurality of means for capturing images 100. The present invention can join the trajectories of the person tracks from a video of a means for capturing images 100 to another video of a means for capturing images 100 while the person appears and disappears between the fields of view among a plurality of means for capturing images 100. Based on the tracking information, the present invention performs the path analysis 470 of the particular person. The path analysis 470 can be used as one of the ways to process the behavior analysis 480 of a person and obtain useful information about the person's behavior, such as engagement behavior with the digital campaign.

The present invention can utilize any reliable video-based tracking method for a single customer and a group of customers in the prior art, in regards to the behavior analysis. For example, U.S. patent application Ser. No. 11/901,691 of Sharma, et al., (hereinafter Sharma Ser. No. 11/901,691) disclosed an exemplary process of video-based tracking and behavior analysis for a single customer or a group of customers, using multiple means for capturing images in a preferred embodiment of the invention, based on the spatial and temporal attributes of the person tracking.

The present invention can also process segmentation 236 of the people, based on the images of the people in the video. Demographic classification 814 is an exemplary segmentation 236 of the people.

The present invention can utilize any reliable demographic composition measurement method in the prior art as an exemplary video-based segmentation of the people. For example, U.S. patent application Ser. No. 11/805,321 filed on May 23, 2007 of Sharma, et al., (hereinafter Sharma Ser. No. 11/805,321) disclosed an exemplary demographic composition measurement based on gender and ethnicity.

The segmentation 236 and behavior analysis 480 data are used to produce indices 617, and the indices 617 are sent to the module for the association of measurements and analyses 276, which performs the package effectiveness measurement 280.

Impression analysis 223 and emotion analysis 224 are carried on images of the people in relation to the changes in package concepts to measure the attitudinal impact the change has on the people.

There are two types of impression measurement in an exemplary embodiment of the present invention. The first level of the impression measurement is to count and measure the impression length, and the second level of the impression measurement is deeper impression analysis in correlation with other parameters, such as the relationship of the package version with the surrounding packages, demographic segmentations, and temporal attributes. With regard to the first level of impression count and measurement, the present invention can utilize any well-known impression measurement method. U.S. patent application Ser. No. 11/818,554 filed on Jun. 14, 2007 of Sharma, et al., (hereinafter Sharma Ser. No. 11/818,554) disclosed details of a system for measuring the impression level through the viewership of people. An exemplary embodiment of the present invention shown in FIG. 3 can utilize Sharma Ser. No. 11/818,554 for the first level of impression measurement in the impression analysis 223, especially utilizing the 3D facial pose estimation 534.

The impression analysis 223 and emotion analysis 224 measurements are very important to understanding the impact the packaging had on the people who were exposed to it. The measurements can teach us to understand whether the packaging was engaging enough to hold the attention of the people, and whether the packaging produced the desired emotional change in the people.

In an exemplary embodiment, the impression analysis module 223 can utilize other variables to measure the deeper level of impression. The other variables can comprise relationship of the package version with the surrounding packages, demographic segmentations, and temporal attributes. For example, a more than average number of impression counts for a package in relation to a specific demographic group indicates that the packaging was able to attract and engage the specific demographic group in a particularly meaningful pattern. Likewise, the impression count data can be analyzed to measure the impact to each predefined demographic group in relation to the packaging. Each metric gives a measure of effectiveness of the packaging as a whole and individual graphics. A package that can attract more people and engage them longer can be considered better than the package that does not.

The emotion analysis 224 module measures the emotional response people have to a given package. Whenever a person engages with a package, his or her facial expression could change in reaction to the packaging.

Usually the goal of the packaging is to entice a positive and happy response. The degree (valance) by which a person reacts to a package will be measured using vision-based technologies. A set of video input images 330 is provided to the emotional change detection sub-module that measures the magnitude of the emotional change.

This reaction is defined as the persuasiveness of the packaging. The average of all emotional reactions to a package can be considered as the unified emotional response to the packaging. The following equation gives an exemplary way to calculate persuasiveness.

$$\text{persuasiveness} = \frac{k}{\text{Total\_impressions}} \sum_{n=1}^{k} \partial \text{emotion}_n$$

Where k is the total number of impression that had an emotional response to the packaging $\partial \text{emotion}_n$ is the change in response associated with the nth impression.

Several approaches exist for analyzing static images of faces to track the expressions and estimate the emotional state of a person. For example, J. Cohn, A. J. Zlochower, J. Lien, and T. Kanade, "Automated face analysis by feature point tracking has high concurrent validity with manual FACS coding," Psychophysiology, pp. 35-43 1999 (hereinafter Cohn), focus on classification of static images of the face, which are associated with expression of particular emotions. Several approaches have also been reported for analyzing a sequence of images for facial expression analysis and estimating the emotional state of a person. For example, I. Essa and A. Pentland, "Facial expression recognition using a dynamic model and motion energy," presented at International Conference on Computer Vision, June 1995 (hereinafter Essa) disclosed an automated system for facial expression detection using optical flow coupled with a physical model of face muscles to describe the facial motions, and Y. Yacoob and L. Davis, "Recognizing Human Facial Expression," University of Maryland, Technical Report CS-TR-3265, May 1994, (hereinafter Yacoob) followed a three-level recognition approach based on the optical flow of points with high gradient values. The above methods aim at classifying low-level facial expressions into FACS type Action Units (AU's).

The present invention can utilize an approach for measuring the change in emotion in response to packaging from an analysis of the change of the facial expression, as suggested in Cohn and Essa. Specifically, the present invention can detect a positive or negative change in the "valence" of the emotion so that it can be used as a measure of persuasiveness of the packaging.

The measured data can be stored in a database at the data collection process 650. The analysis of the measured data can be further facilitated by applying 983 a set of predefined rules in a rule-base 982.

In an exemplary embodiment of the present invention, a plurality of means for capturing images 100, i.e., the first means for capturing images 101 and the second means for capturing images 102, are connected to the means for video interface. If the distance between the plurality of means for capturing images 100 is greater than a control and processing system can handle, e.g., in order to cover the multiple areas for the targeted package concepts that are located far from each other, the plurality of means for capturing images 100 can be connected to multiple means for video interface. The digitized video data from the means for video interface is transferred to the control and processing system that executes computer vision algorithms on the data. The control and processing system can have internal means for storing data or external means for storing data.

The first means for capturing images 101 can be installed near a measured package and the second means for capturing images 102 near another compared package, and they are connected to the means for video interface through cables. The means for capturing images 100 can comprise an analog camera, USB camera, or Firewire camera. The means for video interface, which can comprise a video frame grabber, USB interface, or Firewire interface, are typically included in the same enclosure as the control and processing system. The control and processing system can be a general purpose personal computer, such as a Pentium 4 PC, or a dedicated hardware that can carry out the required computation. The control and processing system, as well as the means for video interface, can be placed locally or remotely, as long as the connection to the means for capturing images 100 can be established. The internal means for storing data, such as internal hard disks, is placed within the same enclosure as the control and processing system. The external means for storing data, such as a network storage driver or internal hard disks contained in a remote computer, can be placed locally or remotely, as long as a means for transferring data is available.

In an exemplary embodiment, a general purpose USB webcam can serve as the means for capturing images 100. A Pentium 4 2.8 GHz PC having 1 GB memory can serve as a control and processing system, where a generic USB interface included in the PC's motherboard can serve as a means for video interface. A generic IDE hard disk drive can serve as the internal means for storing data or the external means for storing data.

Figure 4:
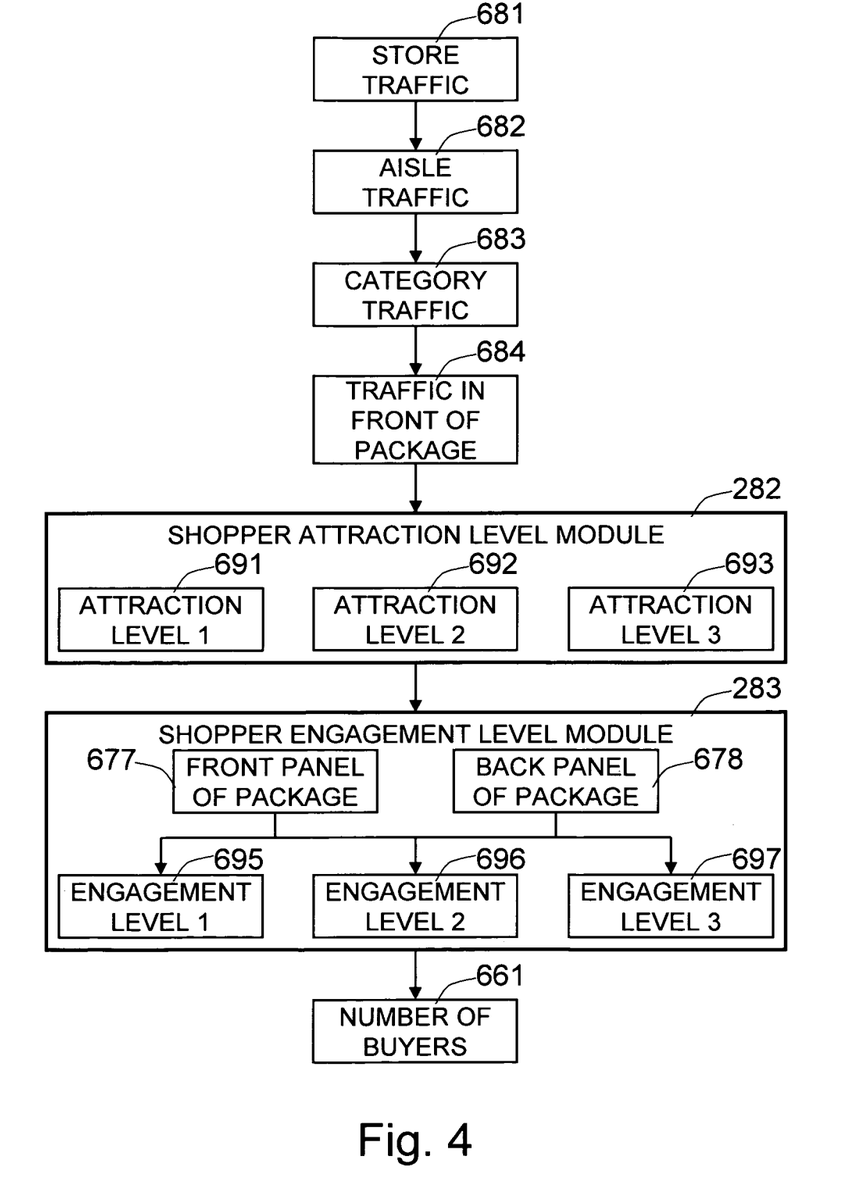
FIG. 4 shows exemplary processes of one of the preferred embodiments of the invention according to the customer interaction stage.

FIG. 4 shows exemplary processes of one of the preferred embodiments of the invention according to the customer interaction stage.

In an exemplary embodiment, the present invention can identify numbers along various interaction stages of the person with each package and measure indices. For example, the present invention counts the store traffic 681, aisle traffic 682, category traffic 683, and traffic in front of the package 684. This identifies the ability of the package to reach shoppers for influencing them to attract, engage, and ultimately make a purchase.

The present invention also identifies the ability of the package to attract shoppers along various degrees—from glancing at the package to noticing it for some time period or extended time periods. For example, the shopper attraction level module 282 makes a decision for the attraction level of shoppers based on predefined criteria for the attraction levels, i.e. "attraction level 1" 691, "attraction level 2" 692, and "attraction level 3" 693. In the example, the "attraction level 1" 691 can represent shoppers glanced at package, "attraction level 2" 692 can represent shoppers noticed package for some time, and "attraction level 3" 693 can represent shoppers noticed package for extended periods. The decision process in the shopper attraction level module 282 utilizes the spatial and temporal data produced by the video-based analysis of the shoppers as discussed in FIG. 3. For example, if a shopper's track stays at a location, Loc(Xi,Yi), within a bounding box in the vicinity of a package for a longer threshold of time "Thi" but less than or equal to another threshold "Th2" of time, the activity can be identified as belonging to one of the attraction-level categories, based on the predefined values for the thresholds "Thi" and "Th2". As discussed, the details of the behavior analysis based on the spatial and temporal attributes of the person tracking can be found in Sharma Ser. No. 11/901,691.

Further, the present invention evaluates the engagement process of the person with each packaging concept in granular detail. The granular detail analysis involves evaluating the physical interaction of shoppers with the package, like reading labels, comparing products, comparing package sizes, and sniffing products.

For example, the shopper engagement level module 283 makes a decision for the engagement level of shoppers based on predefined criteria for the engagement levels, i.e. "engagement level 1" 695, "engagement level 2" 696, and "engagement level 3" 697, in response to the package concepts on the front panel of the package 677 and back panel of the package 678. In the example, the "engagement level 1" 695 can represent shoppers' behavior for sniffing the package, "engagement level 2" 696 can represent shoppers' behavior for reading labels on the package, and "engagement level 3" 697 can represent shoppers' behavior for comparing packages. The decision process in the shopper engagement level module 283 can also utilize the spatial and temporal data produced by the video-based analysis of the shoppers in a similar way as the decision process of the shopper attraction-level module 282 discussed above. However, for complex engagement activities, the decision process in the shopper engagement-level module 283 utilizes the semi-automatic other data measurement and analysis for interaction 215, where a manual annotation tool is used.

Finally, the present invention will identify the number of shoppers 661 that make a purchase.

Figure 5:
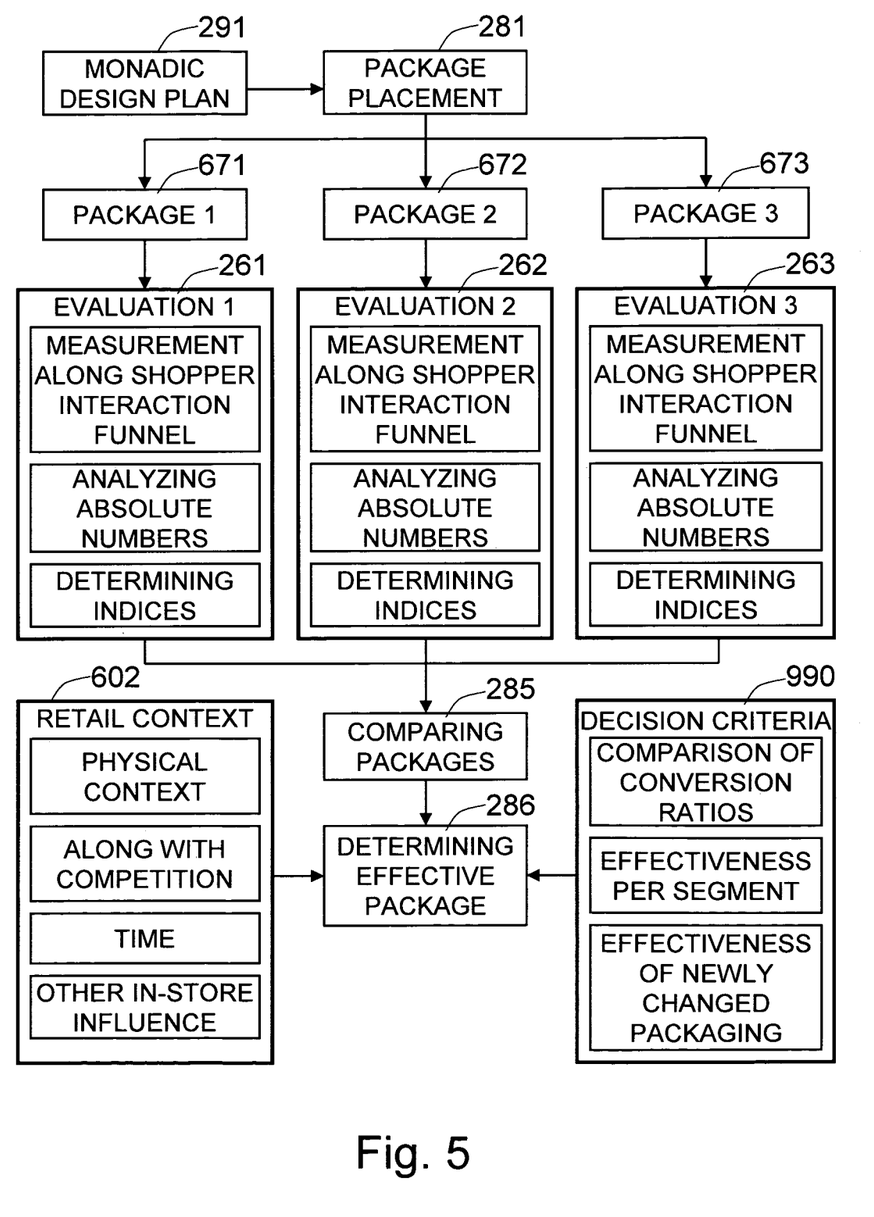
FIG. 5 shows detailed processes for an exemplary package effectiveness measurement.

FIG. 5 shows detailed processes for an exemplary package effectiveness measurement.

Based on a monadic design plan 291, the packages 281, such as the package 1 671, package 2 672, and package 3 673, are placed in predefined locations in a store. In each evaluation process, e.g., "evaluation 1" 261, "evaluation 2" 262, and "evaluation 3" 263, the present invention measures the variables along each stage of the shopper interaction funnel, analyze the absolute numbers of the shopper interaction, and determine indices that indicate the performance of the each package concept, as shown in a part of FIG. 3. The packaging concepts are compared 285 with each other along several measures, based on the package effectiveness decision criteria 990, to determine the packaging effectiveness 286. The package effectiveness decision criteria 990 can comprise comparison of conversion ratio among the indices along each stage of the shopper interaction funnel, effectiveness count per shopper segment, prominent value changes induced by the newly changed factors in the package design. The comparison along multiple measures provides a performance score card for each concept, indicating its ability to drive desired shopper behavior.

The present invention measures packaging effectiveness 286 in a retail context 602 by carefully documenting shopper interactions with the package. Evaluating packaging concepts in isolation—by showing them on a computer screen or on a board in a lab—without considering the way they are merchandised in a retail setting—could distort the effectiveness measure of a package. Therefore, the present invention evaluates packages in the retail context 602 to provide an accurate assessment with regard to competition. Contextual information, such as competition from a large number of similar products in a store, can affect how the packaging performs for a particular product. For example, packages with good design may lose its value, depending on context. Therefore, evaluating packages in a context is an important part of the packaging effectiveness measurement in the present invention.

Evaluating a package in the retail context 602 further shows the correlation between the contextual information and the package performance. The retail context in the present invention comprises information from measuring several packaging concepts in a physical location along with the competitors while taking into consideration temporal information, such as time of year, and other in-store factors, like promotion of a product. The retail context in the present invention can also comprise a physical location of the packages, local influence, trends, temporal information, such as time of year, and any type of prior knowledge about the packages.

Figure 6:
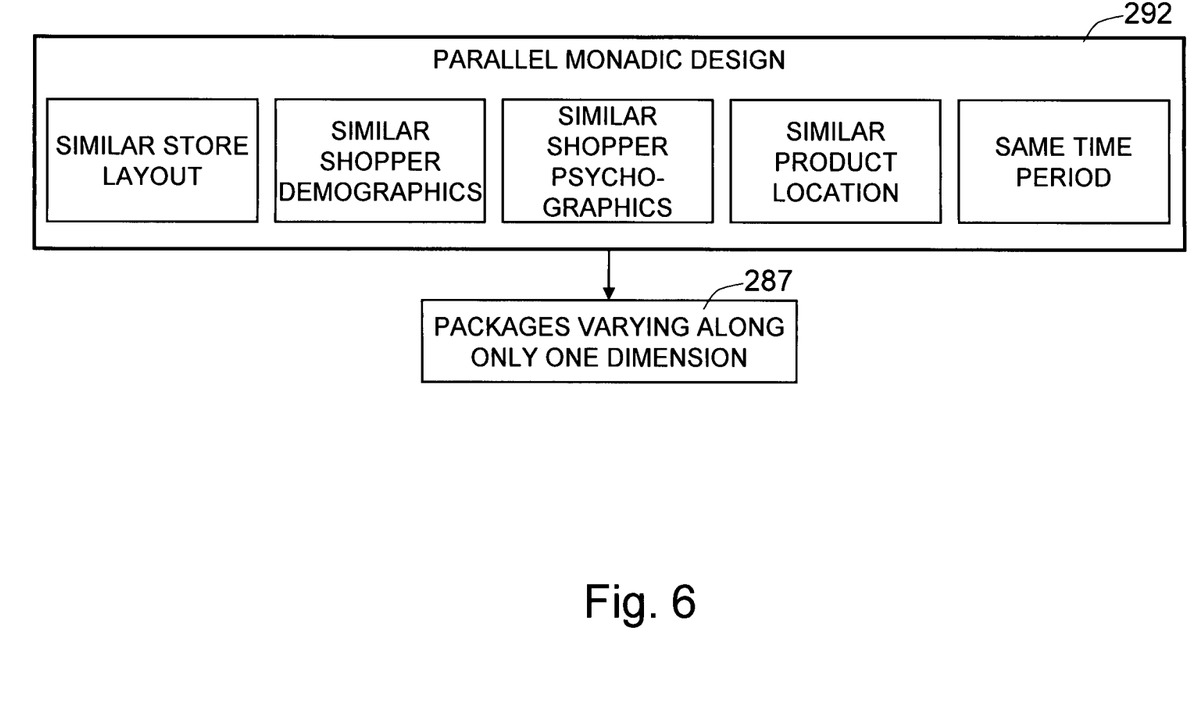
FIG. 6 shows exemplary processes for package effectiveness measurement based on an exemplary parallel monadic design.

FIG. 6 shows exemplary processes for package effectiveness measurement based on an exemplary parallel monadic design 292.

A parallel monadic research evaluation involves testing all packaging concepts during the same time period in multiple stores with a similar demographic and psychographic profile of shoppers. In all the stores under study, care is taken to ensure that the product is merchandised in a similar location (not the same location) and all other in-store environmental factors, such as store layout, shopper demographic composition, and shopper psychographics, are similar during the same time period.

Under the cared condition, the present invention evaluates the packaging effectiveness with respect to one factor 287, once the factor in the package concepts is changed, utilizing the automatic and semi-automatic video based analysis of the shoppers as discussed with regard to FIGS. 2 and 3. The approach can be applied to a feature in multiple package concepts for a new product, and measurement of the effectiveness of the newly changed package concepts.

The measurement will further tell us what type of changes needs to be made for the next packaging concept. For example, changes can be made to a package by highlighting certain nutrition facts, such as high in calcium, low in sugar and salt, and certain ingredients on the package. Then, the change effectiveness can be measured by comparing people's behavioral patterns to the package before and after the changes were made.

Figure 7:
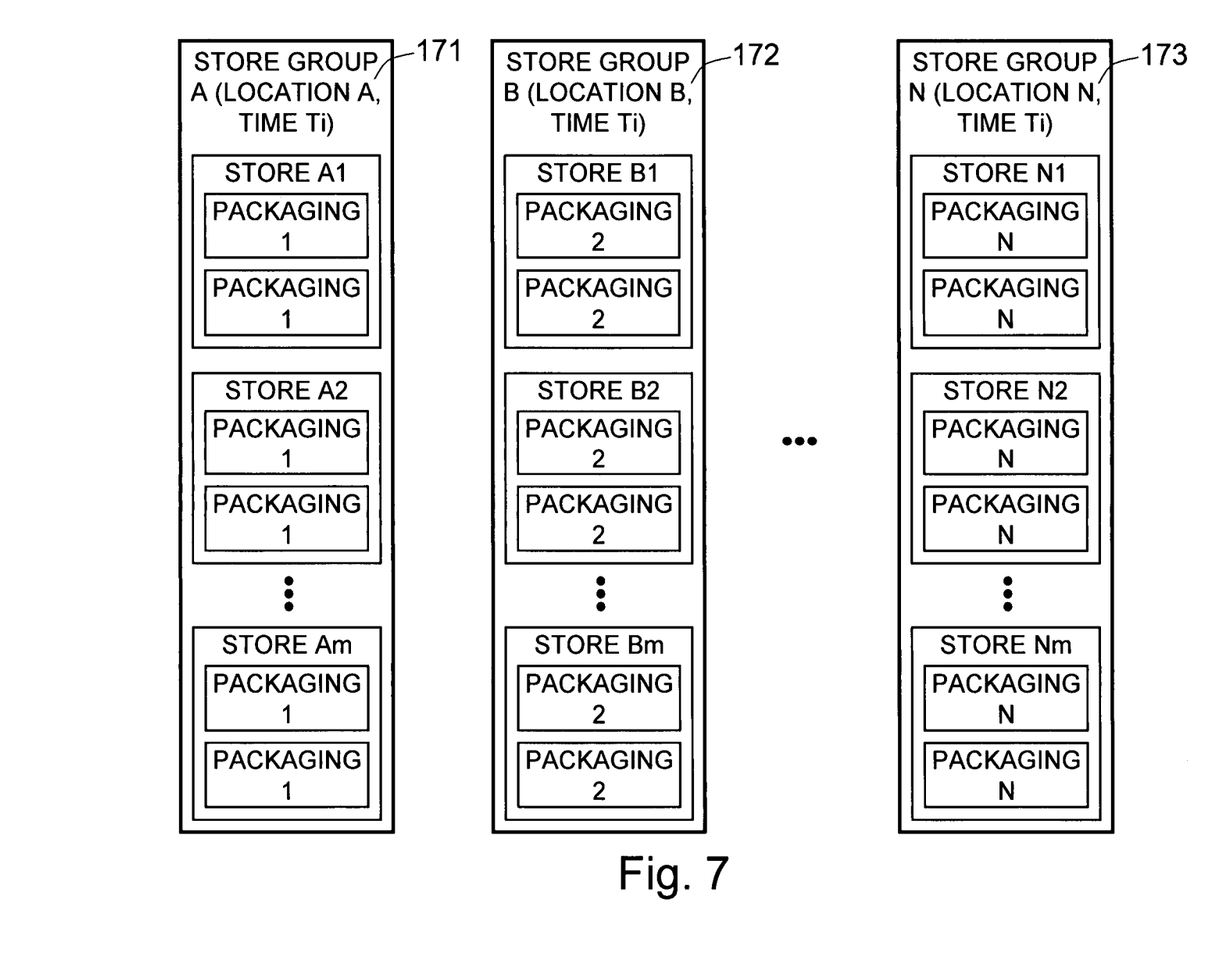
FIG. 7 shows exemplary processes for comparing the measurements among the plurality of package concepts synchronously in a plurality of locations with regard to the parallel monadic design.

FIG. 7 shows exemplary processes for comparing the measurements among the plurality of package concepts synchronously in a plurality of locations with regard to the parallel monadic design.

In an exemplary embodiment, the present invention can compare the measurements among the multiple package concepts synchronously in multiple locations.

For example, in the exemplary embodiment shown in FIG. 7, the stores, such as "store A1", "store A2", and "store Am", in the "store group A (LOCATION A, TIME Ti)" 171 measure the package effectiveness for "packaging 1", the stores, such as "store B1", "store B2", and "store Bm", in the "store group B (LOCATION B, TIME Ti)" 172 measure the package effectiveness for "packaging 2", the stores, such as "store N1", "store N2", and "store Nm", in the "store group N (LOCATION N, TIME Ti)" 173 measure the package effectiveness for "packaging n", and so on, and they are measured at the same predefined window of time T1, although the locations of the measurements are different.

One of the goals of these measurements is to make the condition, environment, and external factors as similar as possible among the measured packages.

Therefore, the compared package concepts are placed in multiple stores that have very similar environments. For example, in the exemplary embodiment, although different package concepts are tested in different store groups, i.e., the store "store A1" measures a different package version than the store "store B1" and "store N1", the environment in the stores, i.e., "store A1", "store B1", and "store N1", is configured to be as similar as possible.

Figure 8:
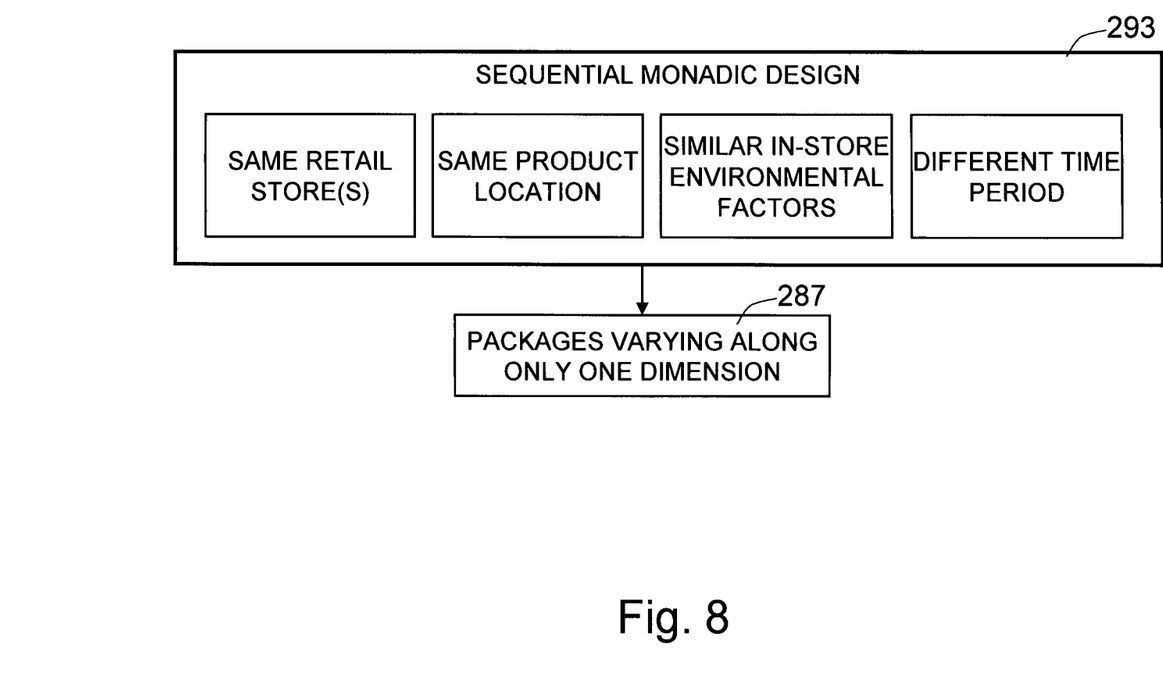
FIG. 8 shows exemplary processes for package effectiveness measurement based on an exemplary sequential monadic design.

FIG. 8 shows exemplary processes for package effectiveness measurement based on an exemplary sequential monadic design 293.

A sequential monadic research evaluation involves testing all packaging concepts in the same retail store(s) and in the same product location during different time periods. After evaluating one concept for a particular time period, for example one week, the next concept is tested. Appropriate care is taken to ensure that the time period does not have any other variation, like changes in the promotional activity of the product or any other change in the in-store environment.

The present invention can evaluate packaging concepts that differ only on one factor 287—for example, different color front panel—during different time periods. The evaluation will be conducted in the same store(s) and in the same product location, with each concept being evaluated for a particular time period. This will help to obtain an accurate assessment of the effectiveness of each concept in influencing shopper behavior.

Figure 9:
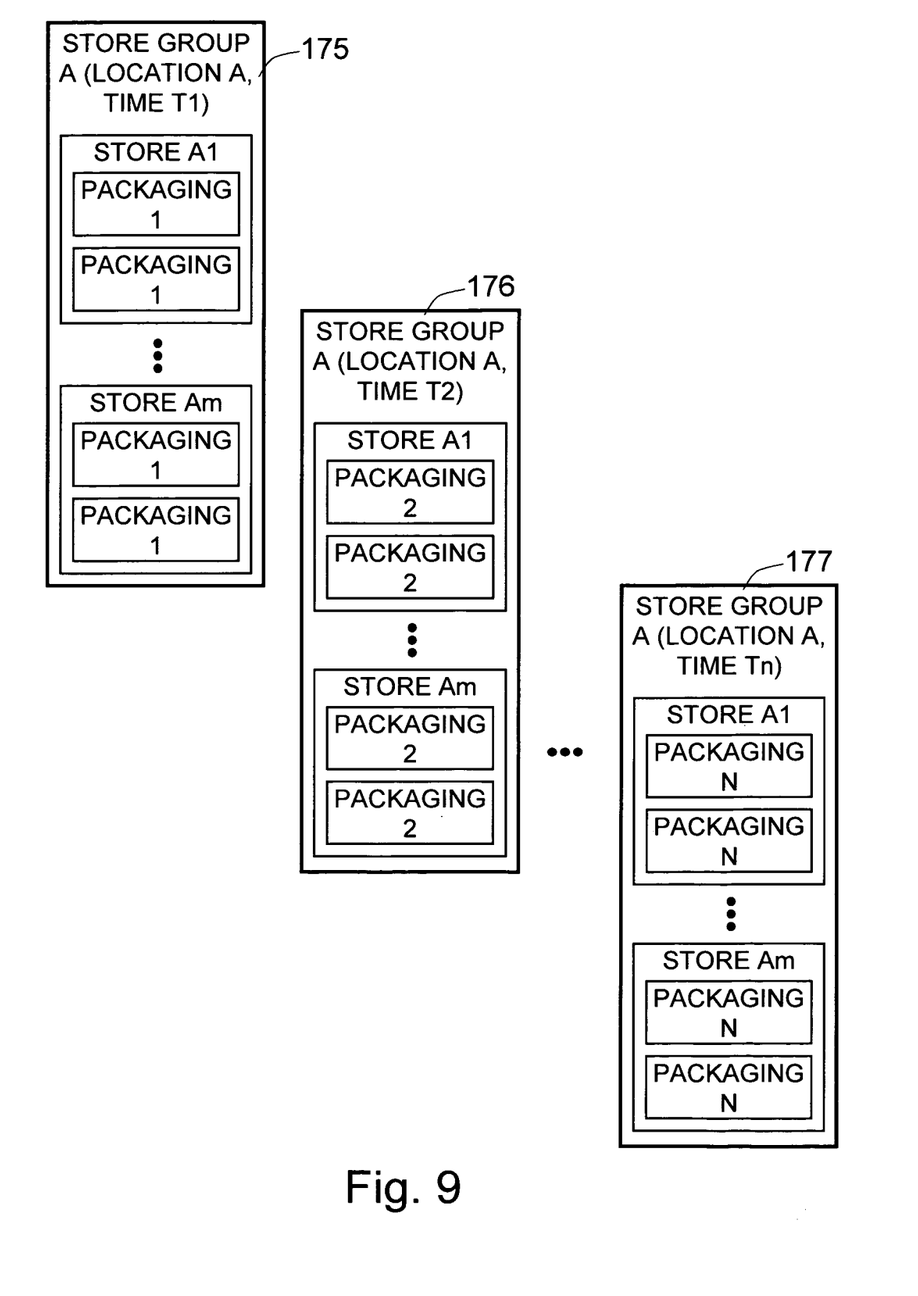
FIG. 9 shows exemplary processes for comparing the measurements among the plurality of package concepts asynchronously in the same locations with regard to the sequential monadic design.

FIG. 9 shows exemplary processes for comparing the measurements among the plurality of package concepts asynchronously in the same locations with regard to the sequential monadic design.

In another exemplary embodiment, the present invention can also compare the measurements among the multiple package concepts asynchronously in the same locations.

For example, in the exemplary embodiment, shown in FIG. 9, the stores, such as "store A1" through "store Am", in the "store group A (LOCATION A, TIME T1)" 175 measure the package effectiveness for "packaging 1", at time T1, "packaging 2", at time T2, "packaging N", at time Tn, and so on, in the same store group location.

Figure 10:
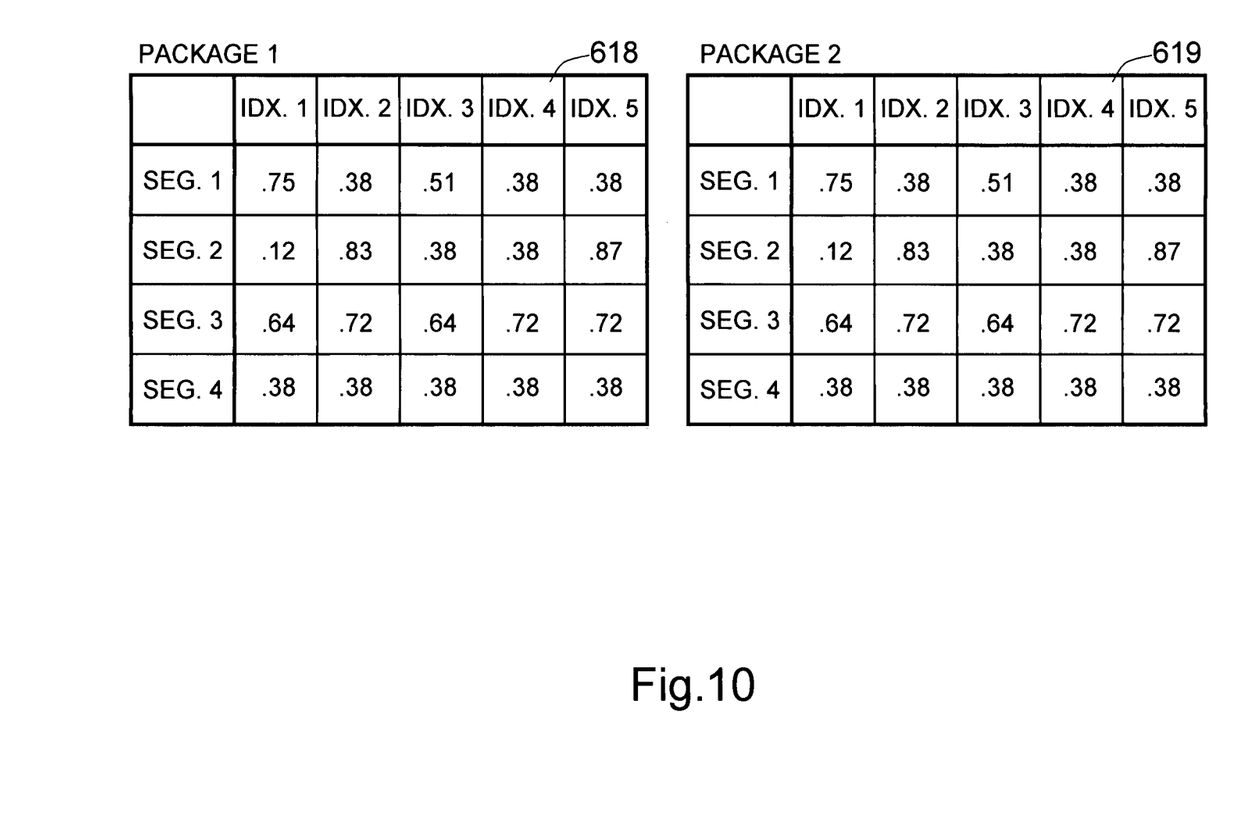
FIG. 10 shows exemplary metrics of indices that are based on the identified numbers along various interaction stages of the customers with each package version and segmentation of the customers.

FIG. 10 shows exemplary metrics of indices, such as the "matrix for package 1" 618 and "matrix for package 2" 619, which are based on the identified numbers along various interaction stages of the customers with each package version, while categorizing the customers into different demographic segments based on gender, age-range, and ethnicity.

The indices can comprise a reach to attract index, attract to engage index, and engage to motivate index. Then, the present invention compares the measurements among the multiple package concepts that are evaluated. For each package, the present invention produces a metrics with the indices and compares it with that of the other concepts, thus providing a tool for evaluating the effectiveness of various packaging concepts.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for measuring packaging effectiveness based on video-based analysis of a plurality of persons using a control and processing system that executes computer vision algorithms on a plurality of input images transferred to the control and processing system through a means for video interface, comprising the following steps of:
   a) processing a behavior analysis of a person based on a path analysis of the person by executing a computer vision-based tracking algorithm on the plurality of input images to obtain information about the person's behavior with package concepts using the control and processing system,
   b) processing a segmentation of the person, including demographic analysis, by applying a computer vision-based demographic classification algorithm to the plurality of input images in relation to the package concepts,
   c) detecting an emotion change of the person,
   d) producing indices along various interaction stages of the person with each package concept based on the behavior analysis, the segmentation, and the emotion change detection,
   e) sending the indices to a module for an association of measurements and analyses, which performs a package effectiveness measurement, including a comparison of the indices among a plurality of package concepts, and
   f) producing comparison results of the indices in relation to the segmentation,
   g) organizing the measurement of the packaging effectiveness based on the segmentation and trips of the plurality of persons,
   wherein the segmentation comprises demographic segments, including age-range, gender and ethnicity,
   wherein the trips comprise a shopping pattern of said plurality of persons, and wherein the indices comprise reach to attract index, attract to engage index, and engage to motivate index.

2. The method according to claim 1, wherein the method further comprises a step of measuring packaging effectiveness in a retail context by documenting shopper interactions with the package concepts, based on the behavior analysis and the segmentation,
   wherein the retail context comprises information from measuring several package concepts in a physical location along with other package concepts from competitors while taking into consideration temporal information, including time of year, and other in-store factors, like promotion of a product, and
   wherein the retail context further comprises a physical location of the package concepts, local influence, trends, and a prior knowledge about the package concepts.

3. The method according to claim 1, wherein the method further comprises a step of comparing the measurements among the plurality of package concepts synchronously in a plurality of store locations,
   wherein the plurality of store locations have similar store layout, shopper demographic composition, shopper psychographics, and product location.

4. The method according to claim 1, wherein the method further comprises a step of comparing the measurements among the plurality of package concepts asynchronously in a store and a product location during different time periods,
   wherein the plurality of package concepts differ at most on one factor during the different time periods.

5. The method according to claim 1, wherein the method further comprises steps of:
   a) changing a feature in the package concepts, and
   b) measuring the effectiveness of the newly changed package concepts,
   wherein the package concepts are compared with each other along several measures, based on package effectiveness decision criteria, to determine the effectiveness, and
   wherein the package effectiveness decision criteria comprise comparison of conversion ratios among indices along each stage of a shopper interaction funnel, effectiveness count per shopper segment, prominent value changes induced by the newly changed feature in the package concepts.

6. An apparatus for measuring packaging effectiveness based on video-based analysis of a plurality of persons, comprising:
   a) at least a means for capturing images in the vicinity of a plurality of package concepts, wherein the means for capturing images captures a plurality of input images of said plurality of persons,
   b) at least a means for video interface that is connected to the means for capturing images, and
   c) a control and processing system that executes computer vision algorithms on the plurality of input images for tracking at least a person,
   performing a path analysis of the person based on the tracking,
   processing a behavior analysis of the person based on the path analysis to obtain information about the person's behavior, including engagement behavior with the package concepts,
   processing a segmentation of the person, including demographic analysis in relation to the package concepts,
   detecting an emotion change of the person,
   producing indices along various interaction stages of the person with each package concept based on the behavior analysis, the segmentation, and the emotion change detection,
   sending the indices to a module for an association of measurements and analyses, which performs a package effectiveness measurement, including a comparison of the indices among the plurality of package concepts, and
   producing comparison results of the indices in relation to the segmentation,
   organizing the measurement of the packaging effectiveness based on the segmentation and trips of the plurality of persons,
   wherein the segmentation comprises demographic segments, including age-range, gender and ethnicity,
   wherein the trips comprise a shopping pattern of said plurality of persons, and wherein the indices comprise reach to attract index, attract to engage index, and engage to motivate index.

7. The apparatus according to claim 6, wherein the apparatus further comprises means for measuring packaging effectiveness in a retail context by documenting shopper interactions with the package concepts, based on the behavior analysis and the segmentation,
   wherein the retail context comprises information from measuring several package concepts in a physical location along with other package concepts from competitors while taking into consideration temporal information, including time of year, and other in-store factors, like promotion of a product, and
   wherein the retail context further comprises a physical location of the package concepts, local influence, trends, and a prior knowledge about the package concepts.

8. The apparatus according to claim 6, wherein the apparatus further comprises means for comparing the measurements among the plurality of package concepts synchronously in a plurality of store locations,
   wherein the plurality of store locations have similar store layout, shopper demographic composition, shopper psychographics, and product location.

9. The apparatus according to claim 6, wherein the apparatus further comprises means for comparing the measurements among the plurality of package concepts asynchronously in a store and a product location during different time periods,
   wherein the plurality of package concepts differ at most on one factor during the different time periods.

10. The apparatus according to claim 6, wherein the apparatus further comprises:
   a) means for changing a feature in the package concepts, and
   b) means for measuring the effectiveness of the newly changed package concepts,
   wherein the package concepts are compared with each other along several measures, based on package effectiveness decision criteria, to determine the effectiveness, and
   wherein the package effectiveness decision criteria comprise comparison of conversion ratios among indices along each stage of a shopper interaction funnel, effectiveness count per shopper segment, prominent value changes induced by the newly changed feature in the package concepts.

* * * * *